UNITED STATES PATENT OFFICE.

WILLIAM H. STERLING, OF SAN FRANCISCO, CALIFORNIA.

IMPROVEMENT IN PROCESSES AND COMPOSITIONS FOR THE MANUFACTURE OF ILLUMINATING-GAS.

Specification forming part of Letters Patent No. 142,959, dated September 16, 1873; application filed February 1, 1873.

*To all whom it may concern:*

Be it known that I, WILLIAM H. STERLING, of the city and county of San Francisco, State of California, have invented an Improved Process and Composition of Matter for the Manufacture of Illuminating and Heating Gases; and I do hereby declare that the ingredients used, and the manner of mixing or compounding them to make the said gases, with the best mode which I have invented or discovered for performing said process, are described in the following specification, with the best apparatus known to me for that purpose.

The nature of my invention relates to the manufacture of illuminating and heating gases from coal-tar and petroleum, by mixing or compounding them with the non-conducting, incombustible, infusible substance, (finely-powdered ashes,) and in mixing at the time of combination, with the coal-tar and petroleum, a sufficient quantity of water to afford, by its decomposition (simultaneously with the hydrocarbon liquids) into its elements of hydrogen and oxygen, these necessary gases for combination with the carbon elements to form the lighter carbureted-hydrogen gases, such as marsh-gas and olefiant gas with the hydrogen, and carbonic oxide with the oxygen; the heavier carbonaceous compounds, such as naphthaline, paraffine, &c., being broken up in the distillation, and a certain portion of their carbon elements being retained by the non-conducting incombustible substance, (ashes,) as pure carbon or coke, while the lighter hydrocarbon gases are driven off. At the same time, by the simultaneous decomposition of the carbon compounds and the water, certain other portions or particles of carbon are combined with the hydrogen and oxygen of the water, forming the lighter carbureted-hydrogen gases and carbonic oxide, as hereinafter described.

In order that my invention may be comprehended and thereby made useful, I give the following methods as being such as can be successfully applied to the manufacture of illuminating and heating gases.

I take any convenient quantity of crude petroleum, to which I add about ten to twenty per cent. of its bulk of water, the quantity of water added depending upon the gravity of the petroleum, the heavier requiring the greater amount of water. I place the two liquids into a suitable vessel provided with appropriate means for a thorough trituration or emulsion—one supplied with stirrers or beaters, as, for instance, a barrel-churn—so that a most intimate or atomical mixture may be obtained of the petroleum and water. In order to facilitate this emulsion, two to five per cent. of caustic lime of the weight of water may be added previous to the agitation or during its continuance; the exact amount of caustic lime used also depending upon the gravity or richness in carbonaceous elements. After thus thoroughly mixing the two liquids I run the mixture into a vessel containing very finely-powdered ashes, and mix or grind the compound thoroughly together to a consistency dry enough to be molded or handled in compact masses; the kind of vessel I use for compounding the ashes with the liquids being a description of mill with a grinding or mixing cylinder, similar to an ordinary paint-mill. When the compound has thus been carefully and completely mixed, I transfer it in compact masses to an ordinary gas-retort and proceed in the usual manner for making coal-gas. The compound may be either molded in blocks of suitable large size or placed in large perforated clay molds, and thus transferred to the retort. In the distillation of coal-tar I proceed to prepare the compound in a similar manner as above described, using a larger percentage if the tar is free from water, or a smaller amount than in the case of the petroleum if the tar already contains considerable water, as is often the case in some instances. Thus the proportions would be about twenty to thirty per cent. of water, including the amount of water already in the tar in mechanical suspension, and not as a chemical combination.

The amount of caustic lime which may be added to facilitate the emulsion, as described, would be about five to ten per cent. of the weight of water, the emulsifying or atomically mixing the coal-tar and water, and the compounding of the mixed liquids with the powdered ashes, being the same as above-described method of mixing the crude petroleum. The compound is then molded in compact masses or blocks, or placed in the perforated clay molds, as above described, and transferred to an ordinary gas-retort and distilled, as above described.

The novelty and rationale of my invention are as follows: First, by using the non-conducting, incombustible, infusible substance (ashes) in a state of very fine powder, (without any combustible, fusible, or heat-conducting substance being mixed with it, by which the compound would be broken down or melted,) thoroughly mixed with these heavy hydrocarbon liquids, (coal-tar and crude petroleum,) they are thereby atomically divided in such a manner that by the comparatively slow conduction of heat to their particles certain of the heavy hydrocarbon compounds are decomposed, a portion of their elementary gases driven off—as the lighter carbureted-hydrogen gases, such as marsh gas, olefiant gas, &c.—while certain other portions of the carbon of the compound are retained by the non-ducting, incombustible substance, (ashes,) as pure carbon or coke, just as the ash or inorganic matter of coal assists in the retention of carbon, as coke of gas-coal. Second, by the very intimate and atomical mixing of a certain quantity of water by emulsifying it with the liquid hydrocarbon, the water is decomposed into its elements of hydrogen and oxygen simultaneously with the decomposition of the liquid hydrocarbon, thereby supplying the requisite gaseous elements for recombination with the carbon of the hydrocarbon compounds which, at the same instant, were decomposed. The manner in which this decomposition and recombination is effected is as follows: The non-conducting, incombustible, infusible properties of the ashes used prevent the melting or breaking down of the mass or blocks of the compound, and the heat is conducted, comparatively slowly, from one particle to the other, one particle becoming red-hot before the contiguous inside particle is highly heated. Thus, when placed in the retort in large blocks or masses, the outer rows, so to speak, of the particles of the mass or blocks become red-hot first, and their hydrogen, combined with a certain portion of the carbon, is driven off, leaving other portions of the carbon (as pure carbon) combined with the incombustible, infusible particles of ashes, and red-hot. The water which is combined with these outer rows is driven off undecomposed, as steam; but now, as these outer atoms or particles of the mass or block of the compound have become red-hot carbon, the succeeding atoms of water from the inner rows become, successively, steam, superheated steam, and then, as they pass over the red-hot particles of carbon of the outer rows, are decomposed, the oxygen being converted into carbonic oxide, and the hydrogen left free to combine with other atoms of carbon which have been simultaneously set free by the decomposition of the hydrocarbon compounds of the coal-tar or petroleum.

The uniform and complete atomical mixing of the liquid hydrocarbon and the water by trituration and emulsion, and the subsequent uniform atomization or separation into minute particles by mixing or compounding with the non-conducting, non-combustible, infusible substance (finely-powdered ashes) without the admixture of any other combustible substance as an additional absorbent, enables me to accomplish the simultaneous decomposition and recombination of the two liquids into the desired gaseous elements in this simple and effective manner.

I am aware that numerous attempts have been made and patents granted to use coal-tar and petroleum as fuel by cementing or combining them in various ways with a variety of combustible substances, such as peat, sawdust, sea-ware or sea-weed, coke, charcoal, coal-dust, chaff, fine coal, and other combustible substances. Among such patents are those granted Henry Slatter, January 15, 1867; Kloezewski and Mindeleff, July 2, 1872; W. E. Wertenbaker, March 21, 1871, all of which, and such combustible substances employed as the carrying vehicle or absorbing agent, I disclaim, as my invention is of a radically different character, I claiming and using finely-powdered ashes as a non-conducting, non-combustible, infusible agent, to enable to effect the simultaneous decomposition of the liquids coal-tar and petroleum and water, and the recombination of their elements into the desired illuminating and heating gases, as described. Neither do I claim ashes, broadly, in the manufacture of gas from petroleum, as I am aware of the patent granted to Wren and Barker, July 31, 1866, who use an absorbent substance as superheaters in two or more separate retorts, through which they pass the vapor of petroleum after first vaporizing the liquid in a different retort which does not contain any absorbent substance, they claiming simply the process of using two or more combined retorts, and not attaching any special importance to any particular kind of absorbent substance. Neither do I claim as novel the use of caustic lime as an emulsifying agent, but only in connection with my particular compound of ashes, coal-tar or petroleum, and water.

I claim and use finely-powdered ashes as the primary combining agent in the compound of coal-tar or petroleum and water as of especial value in the manufacture of illuminating and heating gases for the following reasons, which have not been previously considered by others, nor have the objects of my invention been previously either attained or known in the connection with the use of finely-powdered ashes: I pulverize the ashes to a very fine powder, capable of passing through a No. 90 hole mesh sieve—that is, ninety holes to the linear inch, or eighty-one hundred to square inch. It has thereby the advantage of being in that condition of minute and impalpable pulverization by which, from its lightness and atomical subdivision in compounding with the mixture of the liquid hydrocarbon and water, the particles of the liquid mixture are most minutely and atomically divided and fitted for the simultaneous decomposition of the two liquids when retorted; also, from the non-conducting, non-combustible, infusible properties of the ashes, which substance is superior in these particulars to every other cheap or easily-procurable substance, and for its non-conducting properties superior to all substances known to me, which prevents all breaking down or melting of the blocks or masses of the compound, I am enabled to decompose the heavy hydrocarbon compounds of the coal-tar and petroleum by the retention by the ashes of a certain portion of the carbon as coke, while all of the hydrogen is driven off in combination with other portions of carbon, and at the same time the red-hot particles of carbon, combined with the infusible, con-combustible ashes, act as decomposers of the water simultaneously with the liquid hydrocarbon. These desirable results are attainable by the use of very finely-powdered ashes to a degree not found in the use of any other substance known to me.

These attained results in the combination of ashes as the combining agent in the compound of coal-tar or petroleum, water, and caustic lime, in the manufacture of illuminating and heating gases, are believed to be novel, and not hitherto claimed, or known practically to the arts.

Having thus described my invention, what I claim, and desire to secure by Letters Patent of the United States, is—

1. The compound of powdered ashes, coal-tar or petroleum, water, and caustic lime, when compounded and used in the manufacture of illuminating and heating gases, substantially as described.

2. Powdered ashes, when combined with coal-tar or petroleum, these being mixed with water, and used in the manufacture of illuminating and heating gases, substantially as described.

In witness whereof I have hereunto set my hand and seal.

WILLIAM H. STERLING. [L. S.]

Witnesses:
    C. W. M. SMITH,
    PHILIP MAHLER.